(12) United States Patent
Sung et al.

(10) Patent No.: US 9,712,446 B2
(45) Date of Patent: Jul. 18, 2017

(54) APPARATUS AND METHOD FOR CONTROLLING TRANSMISSION OF DATA TRAFFIC

(71) Applicant: SAMSUNG SDS CO., LTD., Seoul (KR)

(72) Inventors: Ki-Woon Sung, Seoul (KR); Young-Tai Na, Seongnam-si (KR); Hee-Tae Yoon, Seoul (KR); Sang-Bum Kim, Yongin-si (KR)

(73) Assignee: SAMSUNG SDS CO., LTD., Seoul (KR)

( * ) Notice: Subject to any disclaimer, the term of this patent is extended or adjusted under 35 U.S.C. 154(b) by 65 days.

(21) Appl. No.: 14/528,072

(22) Filed: Oct. 30, 2014

(65) Prior Publication Data

US 2016/0050152 A1 Feb. 18, 2016

(30) Foreign Application Priority Data

Aug. 12, 2014 (KR) .................. 10-2014-0104182

(51) Int. Cl.
*H04L 1/00* (2006.01)
*H04L 12/803* (2013.01)
*H04L 12/707* (2013.01)
*H04L 12/891* (2013.01)

(52) U.S. Cl.
CPC ............ *H04L 47/122* (2013.01); *H04L 45/22* (2013.01); *H04L 47/125* (2013.01); *H04L 47/41* (2013.01)

(58) Field of Classification Search
None
See application file for complete search history.

(56) References Cited

U.S. PATENT DOCUMENTS

| | | | |
|---|---|---|---|
| 7,730,201 B1 * | 6/2010 | McAllister | H04L 12/5602 709/233 |
| 8,964,564 B2 * | 2/2015 | Vasseur | H04L 45/02 370/237 |
| 2007/0201371 A1 * | 8/2007 | Chou | H04L 45/12 370/237 |
| 2012/0044806 A1 | 2/2012 | Park et al. | |

FOREIGN PATENT DOCUMENTS

KR  10-2012-0017972 A  2/2012

OTHER PUBLICATIONS

Communication issued Aug. 28, 2015, issued by the Korean Intellectual Property Office in counterpart Korean Patent Application No. 10-2014-0104182.

* cited by examiner

*Primary Examiner* — Bob Phunkulh
(74) *Attorney, Agent, or Firm* — Sughrue Mion, PLLC

(57) ABSTRACT

There is provided an apparatus for controlling transmission of data traffic to a destination node. The apparatus includes: an interface unit configured to obtain information regarding a congestion condition that has occurred on a first routing path during transmission of the data traffic; and a control unit configured to select, based on the information, a second routing path to route, to the destination node, a first portion and a second portion of the data traffic along the first routing path and the second routing path, respectively.

17 Claims, 3 Drawing Sheets

APPARATUS AND METHOD FOR CONTROLLING TRANSMISSION OF DATA TRAFFIC

CROSS-REFERENCE TO RELATED APPLICATION

This application claims priority to and the benefit of Korean Patent Application No. 10-2014-0104182, filed on Aug. 12, 2014, the disclosure of which is incorporated herein by reference in its entirety.

BACKGROUND

1. Field

Embodiments of the present disclosure relate to an apparatus and method for controlling transmission of data traffic, and more specifically, to a technique of distributing data traffic into several routing paths when a congestion condition occurs during transmission of data traffic.

2. Discussion of Related Art

Various methods are known for improving efficiency of data transmission in network environments. For example, an overlay networking technique may achieve improved transmission efficiency by disposing at least one intermediate node or overlay hop between a source node and a destination node.

Even when the overlay networking technique is used for data transmission, a congestion condition may occur due to various factors such as a packet loss, an increase in a round trip time (RTT), and sporadic degradation of a transmission path. When such a congestion condition occurs, a congestion avoidance technique for rapidly decreasing a transmission rate of a path along which data is transmitted may be necessary. However, according to conventional congestion avoidance techniques, if the transmission rate is reduced, then the transmission rate is likely to be gradually increased. This is because, without the alleviation of the congestion condition, a sudden increase in the transmission rate may cause harm to network fairness, that is, fair allocation of shared network sources.

Further, if a protocol for guaranteeing data transmission is adopted in the overlay network environment, continuous attempts to retransmit lost data may aggravate the congestion condition. In order to address the problem, it is possible to transmit, from a source node, the same data over a plurality of pre-defined paths (for example, three paths), and to pick up the data first received at a destination node. According to this approach, even when a congestion condition occurs on a path, the data may be successfully transmitted over a different path. However, a larger number of the transmission paths may require a higher amount of traffic cost for the data transmission.

Moreover, in the transmission of various types of data such as stored massive data (for example, large files that are already stored in a storage device) or real-time multimedia data (for example, real-time generated audio, video or a combination thereof), it is of great importance to reduce a delay time.

In view of the foregoing, there is a need for a novel technique for facilitating highly efficient data transmission if a congestion condition occurs.

SUMMARY

Embodiments of the present disclosure provide an improved technique for controlling transmission of data traffic if a congestion condition occurs during the transmission of the data traffic.

According to an exemplary embodiment, there is provided an apparatus for controlling transmission of data traffic to a destination node, the apparatus including: an interface unit configured to obtain information regarding a congestion condition that has occurred on a first routing path during transmission of the data traffic; and a control unit configured to select, based on the information, a second routing path to route, to the destination node, a first portion and a second portion of the data traffic along the first routing path and the second routing path, respectively.

The information may indicate the congestion condition that has occurred on a link in the first routing path.

The control unit may be configured to select, based on the information, the second routing path from among at least one candidate routing path, and each of the at least one candidate routing path may extend from a predetermined node to the destination node while bypassing the link.

The at least one candidate routing path may diverge from the first routing path at the predetermined node, and the control unit may be further configured to allow the predetermined node to transmit the first and the second portions along the first and the second routing paths, respectively.

The control unit may be further configured to determine, based on the information, a transmission rate of the first portion and a transmission rate of the second portion.

The control unit may be further configured to identify, from among a plurality of nodes on the first routing path, a node at which the second routing path diverges from the first routing path.

The control unit may be further configured to allow the identified node to transmit the first and the second portions along the first and the second routing paths, respectively, when the identified node is the predetermined node.

The second routing path may be a minimum cost path among the at least one candidate routing path.

The information may further indicate at least one of a packet loss rate on the link and a packet delay on the link.

The congestion condition may be detected at an intermediate node on the first routing path, and the information may originate from the intermediate node.

According to another exemplary embodiment, there is provided a method for controlling transmission of data traffic to a destination node, the method including: obtaining information regarding a congestion condition that has occurred on a first routing path during the transmission of the data traffic; and selecting, based on the information, a second routing path to route, to the destination node, a first portion and a second portion of the data traffic along the first routing path and the second routing path, respectively.

The information may indicate the congestion condition that has occurred on a link in the first routing path.

The selecting of the second routing path may include selecting, based on the information, the second routing path from among at least one candidate routing path, and each of the at least one candidate routing path may extend from a predetermined node to the destination node while bypassing the link.

The at least one candidate routing path may diverge from the first routing path at the predetermined node, and the method may further include allowing the predetermined node to transmit the first and the second portions along the first and the second routing paths, respectively.

The method may further include: determining, based on the information, a transmission rate of the first portion and a transmission rate of the second portion.

The method may further include: identifying, from among a plurality of nodes on the first routing path, a node at which the second routing path diverges from the first routing path.

The method may further include: allowing the identified node to transmit the first and the second portions along the first and the second routing paths, respectively, when the identified node is the predetermined node.

The second routing path may be a minimum cost path among the at least one candidate routing path.

The information may further indicate at least one of a packet loss rate on the link and a packet delay on the link.

The congestion condition may be detected at an intermediate node on the first routing path, and the information may originate from the intermediate node.

According to still another exemplary embodiment, there is provided a computer-readable storage medium having stored thereon computer executable instructions which, when executed, perform a method for controlling transmission of data traffic to a destination node, the method including: obtaining information regarding a congestion condition that has occurred on a first routing path during the transmission of the data traffic; and selecting, based on the information, a second routing path to route, to the destination node, a first portion and a second portion of the data traffic along the first routing path and the second routing path, respectively.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, detailed embodiments of the present disclosure will be described with reference to the drawings. The following detailed description is provided to help comprehensive understanding of methods, devices and/or systems described in this specification. However, these are only examples, and the present disclosure is not limited thereto.

In the description below, when it is determined that detailed descriptions of related well-known functions unnecessarily obscure the gist of the present disclosure, detailed descriptions thereof will be omitted. Some terms described below are defined by considering functions in the present disclosure and meanings may vary depending on, for example, a user or operator's intentions or customs. Therefore, the meanings of terms should be interpreted based on the scope throughout this specification. The terminology used in detailed description is provided to only describe example embodiments and not for purposes of limitation. Unless the context clearly indicates otherwise, the singular forms include the plural forms. It will be understood that the terms "comprises" or "includes" when used herein, specify some features, numbers, steps, operations, elements, and/or combinations thereof, but do not preclude the presence or possibility of one or more other features, numbers, steps, operations, elements, and/or combinations thereof in addition to the description. Likewise, the description of an example embodiment in terms of a combination of elements does not preclude the implementation of a suitable subcombination of elements.

Figure 1:
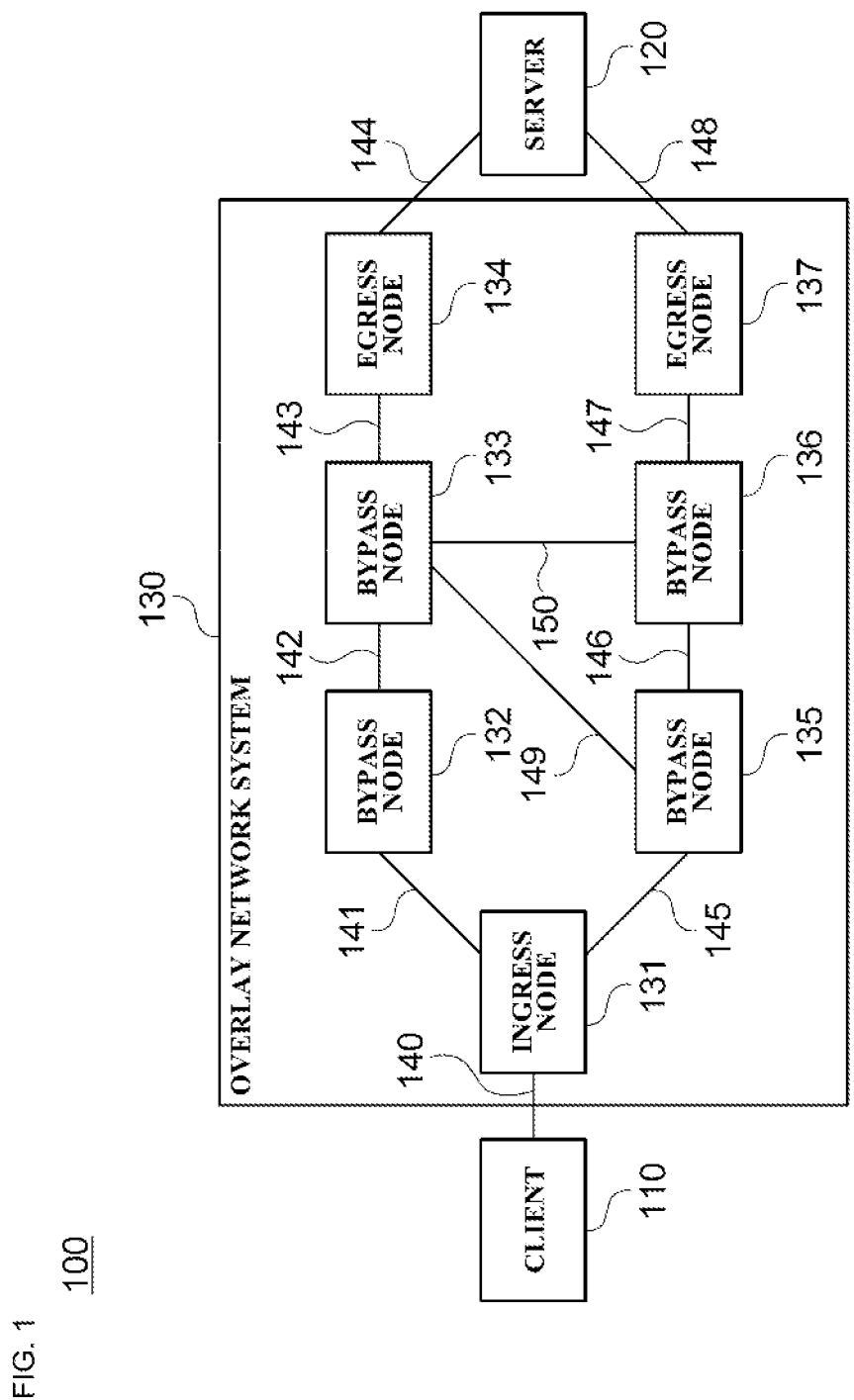
FIG. 1 is a diagram illustrating a network environment according to an exemplary embodiment.

FIG. 1 illustrates a network environment according to an exemplary embodiment.

As illustrated in FIG. 1, a network environment 100 may include a client 110 and a server 120 as two endpoint nodes. Also, the network environment 100 may further include an overlay network system 130 located between the client 110 and the server 120. For example, when a voice recognition service is provided from the server 120 to the client 110, the voice recognition service may be performed such that the client 110 transmits data representing voice to the server 120 through the overlay network system 130, and the server 120 recognizes the voice from the data and, based on the recognized voice, provides other data to the client 110 through the overlay network system 130. As another example, a service for large file transmission between the client 110 and the server 120 may be provided. This service may transmit a file stored in the client 110 to the server 120 through the overlay network system 130 and/or transmit another file stored in the server 120 to the client 110 through the overlay network system 130.

The overlay network system 130 may include, as intermediate nodes, at least one ingress node (IN), at least one bypass node (BN), and at least one egress node (EN). For example, as illustrated in FIG. 1, the overlay network system 130 may include an IN 131, BNs 132, 133, 135, and 136, and ENs 134 and 137. Accordingly, data may pass into the overlay network system 130 from the client 110 through the IN 131. Further, the data may pass out of the overlay network system 130 to the server 120 through the EN 134 or the EN 137. Further, the BNs 132, 133, 135, and 136 may relay the data communication so that the data may be transmitted from the IN 131 to the EN 134 or the EN 137.

There may be at least one path available for data transmission between a first node and a second node among the nodes 110, 120, 131, 132, 133, 134, 135, 136, and 137 in the network environment 100. Such a transmission path may include at least one link among links 140, 141, 142, 143, 144, 145, 146, 147, 148, 149, and 150. Further, when a third node among the nodes 110, 120, 131, 132, 133, 134, 135, 136, and 137 is located on the path, it can be appreciated that the path includes the path between the first node and the third node and the path between the third node and the second node.

In the network environment 100, a policy may be adopted for guaranteeing data transmission between the client 110 and the server 120. In order to guarantee such end-to-end transmission, each of the endpoint nodes 110 and 120 and at least some of the intermediate nodes 131, 132, 133, 134, 135, 136, and 137 may detect an occurrence of a congestion condition (for example, a data loss and/or a data transmission delay) and request data retransmission. In other words, each of these nodes may include at least one protocol for guaranteeing node-to-node transmission. However, according to some embodiments, data transmission may not be guaranteed between particular nodes among the intermediate nodes 131, 132, 133, 134, 135, 136, and 137. With such non-guaranteed node-to-node transmission, even if a congestion condition occurs during the data transmission between the particular nodes, each of the particular node may not directly request data retransmission while an endpoint node (for example, the server 120) in the network environment 100 requests the retransmission.

Figure 2:
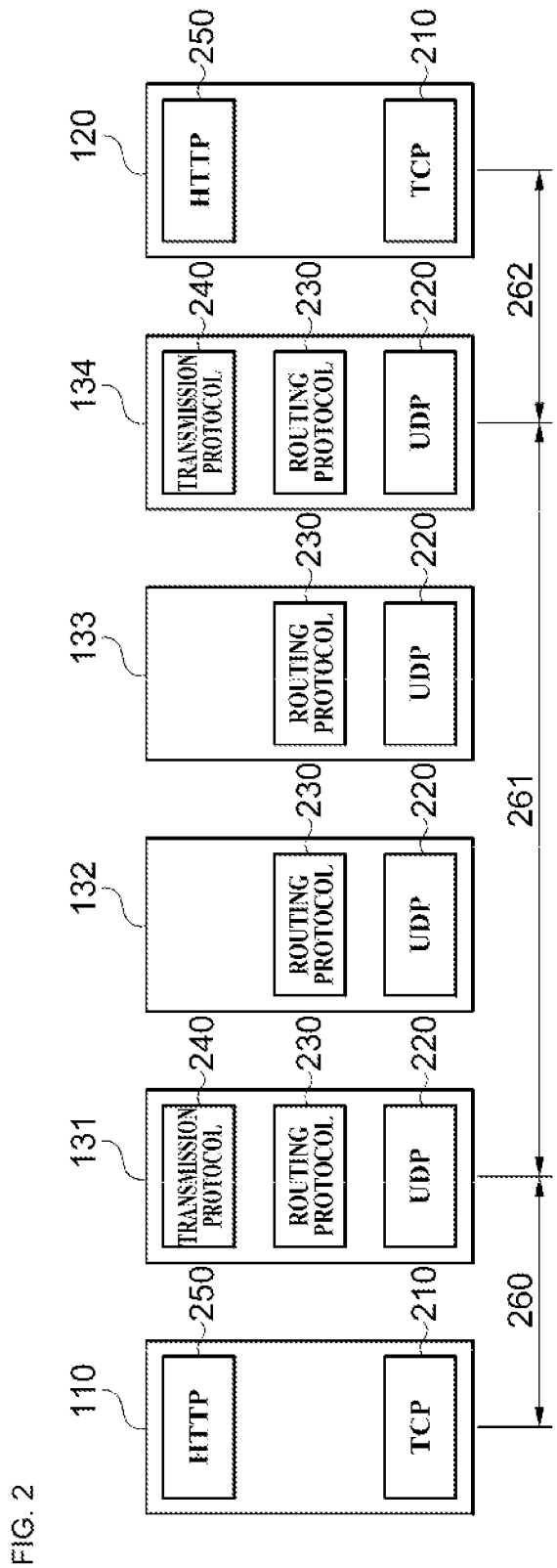
FIG. 2 is a diagram schematically illustrating a protocol stack of nodes in a network environment according to an exemplary embodiment.

For example, as illustrated in FIG. 2, each of the nodes 110, 131, 132, 133, 134, and 120, which are located on a routing path (hereinafter also referred to as the "routing path $RP_1$") extending from the client 110 to the server 120 along the links 140, 141, 142, 143, and 144, may include several protocols. It can be understood from FIG. 2 that each of the client 110 and the server 120 includes a transmission control protocol (TCP) 210, and that each of the intermediate nodes 131, 132, 133, and 134 includes a user datagram protocol (UDP) 220. Further, each of the intermediate nodes 131, 132, 133, and 134 may include a routing protocol 230. Further, each of the IN 131 and the EN 134 may include a transmission protocol 240 for guaranteeing data transmission. In addition, each of the nodes 110, 131, 132, 133, 134, and 120 may further include an additional protocol (for example, an application layer protocol such as a hypertext transfer protocol (HTTP) 250).

As illustrated in FIG. 2, when the transmission protocol 240 is contained in the IN 131 and the EN 134, data transmission 260 between the client 110 and the IN 131, data transmission 261 between the IN 131 and the EN 134, and data transmission 262 between the EN 134 and the server 120 may be guaranteed. On the other hand, data transmission between the IN 131 and the BN 133 may not be guaranteed. Similarly, data transmission between the BN 132 and the EN 134 may not be guaranteed.

According to some embodiments, the transmission protocol 240 may be contained in the BNs 132 and 133 as well, and, therefore, data transmission between any two nodes among the nodes 110, 131, 132, 133, 134, and 120 may be guaranteed.

Further, according to the routing protocol 230 in FIG. 2, each of the intermediate nodes 131, 132, 133, and 134 may detect a congestion condition that has occurred during data transmission through the node and generate information regarding the congestion condition. The congestion condition information may be shared among all of the nodes 131, 132, 133, and 134 or some of the nodes 131, 132, 133, and 134 (for example, nodes predetermined according to the routing protocol 230). The routing protocol 230 may be defined to reflect the congestion condition information in selection of a routing path along which the data traffic is to be delivered to a destination node (for example, the server 120). Accordingly, the routing protocol 230 may route the data traffic in transit to the destination in a manner that distributes the data traffic based on the information regarding the congestion condition.

For illustrative purposes, it is assumed that the routing path $RP_1$, which includes the links 140, 141, 142, 143, and 144, is selected as an initial path for transmitting, from the client 110 to the server 120, data traffic of packets having an address of the server 120 as a destination address, and that the data traffic passes from the client 110 to the IN 131 at a transmission rate of 100 Mbps. During such data traffic transmission, a congestion condition may occur on the link 143 in the routing path $RP_1$. It may be necessary to transmit the data traffic from the node 133 to the node 134 at a decreased transmission rate, because, with the occurrence of the congestion condition, it may cause harm to network fairness to keep unchanged the transmission rate of 100 Mbps for the transmission of the data traffic from the node 133 to the node 134. Further, another routing path may be additionally selected based on the information regarding the congestion condition. For convenience of description, it is assumed that a routing path (hereinafter also referred to as the "routing path $RP_2$") extending from the client 110 to the server 120 along the links 140, 141, 142, 150, 147, and 148 is additionally selected. Accordingly, while some packets of data traffic are transmitted along the routing path $RP_1$, other packets of the data traffic may be transmitted along the routing path $RP_2$.

A congestion control method such as the following may be adopted for changing the transmission rate on the routing path $RP_1$ and the transmission rate on the routing path $RP_2$ after the congestion condition occurs: (i) a conventional TCP congestion avoidance algorithm, (ii) a specially designed additive increase/multiplicative decrease (AIMD) approach or a specially designed slow start approach, or (iii) a policy predetermined by the overlay network system 130 or an administrator of the overlay network system 130. In accordance with the adopted congestion control method, changes in the above-mentioned transmission rates may vary. For example, an AIMD approach may be adopted for rapidly and drastically reducing the transmission rate on the routing path $RP_1$ and the transmission rate on the routing path $RP_2$ and then gradually increasing the transmission rates up to 80 Mbps and 20 Mbps, respectively. As another example, immediately after the congestion condition occurs, a predetermined policy may initiate data transmission at 80 Mbps over the routing path $RP_1$ and at 20 Mbps over the routing path $RP_2$.

Meanwhile, while packets are transmitted along the routing path $RP_2$ at a transmission rate of 20 Mbps, another congestion condition may occur. In this case, similarly to the above-described method, another routing path may be additionally selected. For convenience of description, it is assumed that a routing path (hereinafter also referred to as the "routing path $RP_3$") extending from the client 110 to the server 120 along the links 140, 141, 142, 149, 146, 147, and 148 is additionally selected. Accordingly, some of the data traffic transmitted along the routing path $RP_2$ may continue to be transmitted along the routing path $RP_2$ and the rest of the data traffic may be transmitted along the routing path $RP_3$. When any routing path passing through at least some of the intermediate nodes 131, 132, 133, 134, 135, 136, and 137 is unavailable for transmitting data traffic from the client 110 to the server 120, the data traffic may be transmitted from the client 110 directly to the server 120. Such direct transmission may be performed on a best effort basis.

According to the technique for routing data traffic based on the congestion condition information as described above, when a congestion condition occurs during transmission of data traffic, retransmission between endpoint nodes is not required and the data traffic may be transmitted through different routing paths in a distributed manner. In particular, such a technique may prevent a decrease in transmission efficiency while guaranteeing network fairness.

Each of the nodes 110, 120, 131, 132, 133, 134, 135, 136, and 137 in the network environment 100 may be implemented in a computing device including at least one processor and a computer readable storage medium such as a memory that is accessible by the processor. The computer readable storage medium may be inside or outside the processor, and connected to the processor using various well-known methods. The computer readable storage medium may have stored therein computer executable instructions. The processor may execute the instructions stored in the computer readable storage medium. When executed by the processor, the instructions may cause the computing device to perform operations according to an exemplary embodiment.

Figure 3:
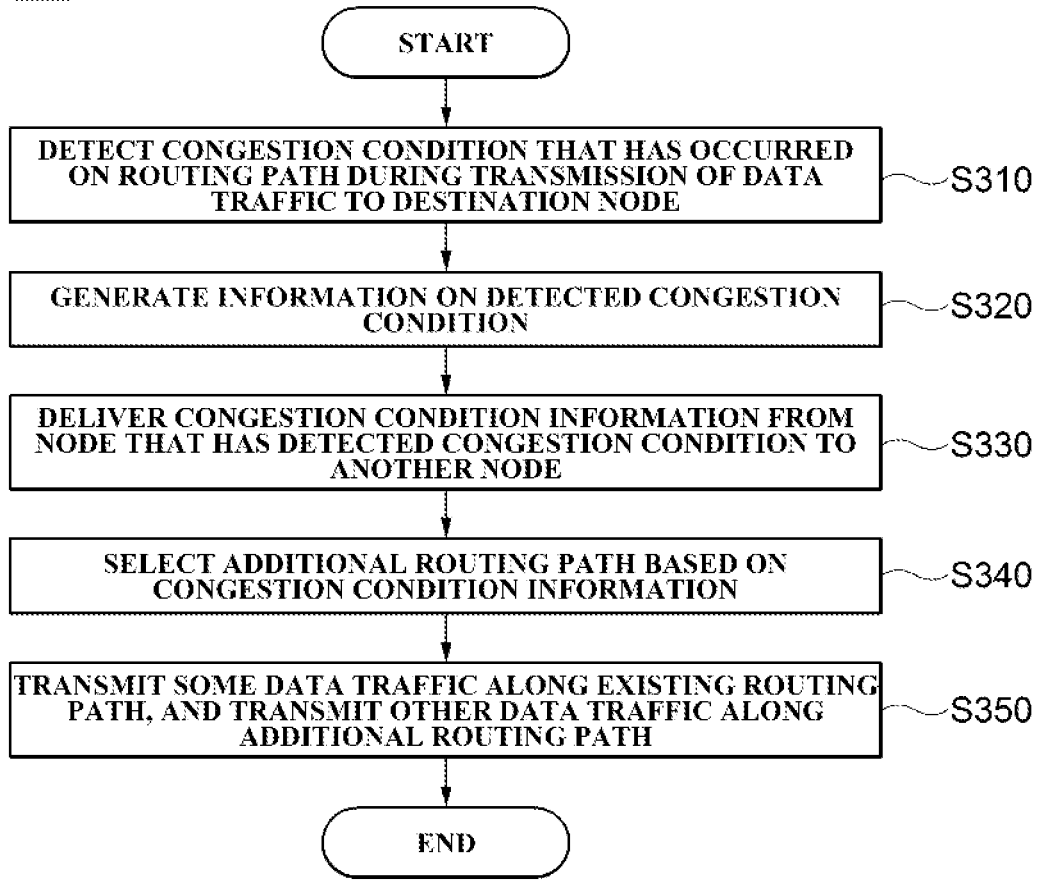
FIG. 3 is a flowchart illustrating a process of controlling transmission of data traffic to a destination node according to an exemplary embodiment.

FIG. 3 illustrates a process of controlling transmission of data traffic to a destination node according to an exemplary embodiment.

After a start operation, an exemplary process 300 advances to operation S310. In operation S310, a congestion condition that has occurred on a routing path during transmission of data traffic to the destination node is detected.

For example, it is assumed that the routing path $RP_1$ is selected for transmission of data traffic from the client 110 to the server 120. In other words, it can be understood that each node on the routing path $RP_1$ selects a routing path that extends from the node to the server 120 and is included in the routing path $RP_1$. For example, it can be understood that the node 133 on the routing path $RP_1$ selects a routing path (hereinafter also referred to as the "routing path $RP-A_1$") extending from the node 133 to the server 120 along the links 143 and 144, and that the node 131 on the routing path $RP_1$ selects a routing path (hereinafter also referred to as the "routing path $RP-B_1$") extending from the node 131 to the server 120 along the links 141, 142, 143, and 144.

As described above, when a congestion condition occurs on the link 143 during transmission of data traffic, the node 134 may detect the congestion condition. According to some embodiments, a predetermined node (for example, the node 131 including the transmission protocol 240) among the intermediate nodes 131, 132, 133, 134, 135, 136, and 137 may transmit a packet in the data traffic, and also an identification number for identifying itself, a sequence number of the packet and/or a timestamp to a next node adjacent to the node. Then, the packet, along with the identification number, the sequence number and/or the timestamp, may be delivered to another node. Therefore, a node (for example, the node 134) that receives the packet transmitted from the node 131 (i) may determine, using the identification number, the sequence number and/or the timestamp related to the packet, whether there is a packet loss or a packet transmission delay, (ii) may accordingly calculate a packet loss rate from the number of packets received for a unit time and the number of lost/delayed packets, and (iii) may eventually determine, in accordance with whether the packet loss rate is greater than a predetermined threshold value, whether the congestion condition occurs.

In operation S320, information regarding the detected congestion condition is generated. For example, after detecting the congestion condition that has occurred on the link 143, the node 134 may generate information indicating the congestion condition. According to some embodiments, the congestion condition information may include a metric representing whether the congestion condition occurs. Further, the congestion condition information may further include a metric representing a packet delay of the link 143 and/or a metric representing a packet loss rate of the link 143.

In operation S330, the congestion condition information is delivered from the node that has detected the congestion condition to another node (for example, a node adjacent thereto and/or another specific node). For example, the congestion condition information may be propagated upon request or when a particular event occurs (e.g., when the congestion condition occurs or when it is determined that a particular metric is greater than a threshold value).

As an example, when the node 134 detects the occurrence of the congestion condition and generates new congestion condition information, the node 134 may immediately deliver the congestion condition information to the node 133. As another example, the node 133 may transmit, to the node 134, a request for the congestion condition information, and, in response to the reception of the request, the node 134 may transmit, to the node 133, the congestion condition information maintained by itself. Further, the congestion condition information generated by the node 134 may be transmitted to a node (for example, through the node 133) other than the node 133. For example, the IN 131 may also obtain the congestion condition information originating from the node 134.

Further, the node (for example, the node 131 or the node 133) that has received the congestion condition information may manage a lifetime of the congestion condition information. For example, when the congestion condition information is not updated within a specific time from a time point at which the congestion condition information is received, the node 133 may discard the congestion condition information.

In operation S340, an additional routing path is selected based on the congestion condition information.

As an example, when the node 133 obtains from the node 134 information regarding the congestion condition that has occurred on the link 143, the node 133 may select, using the obtained congestion condition information, an additional routing path from among at least one candidate routing path. Therefore, some of the data traffic may be routed along the established routing path $RP-A_1$ and some other of the data traffic may be routed along the additional routing path. Each candidate routing path may extend from the node 133 to the destination node (for example, the server 120), and bypass the link 143.

According to some embodiments, when the node 133 obtains the congestion condition information as described above, the node 133 may identify paths that do not pass the link 143, from among available paths from the node 133 to the destination node. Then, the node 133 may set the identified paths as candidate routing paths. In particular, each candidate routing path may diverge from the routing path $RP-A_1$ at the node 133.

Further, the node 133 may compute a cost (which may be calculated based on, for example, a transmission delay time of each link in the path) of each candidate routing path. Therefore, the node 133 may calculate a minimum cost path among the candidate routing paths. Then, the node 133 may select the calculated minimum cost path as the additional routing path. For example, the calculated minimum cost path may be a path (hereinafter also referred to as the "routing path $RP-A_2$") extending from the node 133 to the server 120 along the links 150, 147, and 148. Referring again to FIG. 1, it can be understood that the routing path $RP-A_2$ diverges from the routing path $RP-A_1$ at the node 133.

The minimum cost path refers to a path having a minimum cost among the paths that extend from the node 133 to the destination node and bypass the link 143, and it should be noted that the path is not necessarily the same as a minimum cost path from the node 133 to the destination node. For example, if the routing path $RP_1$ is a minimum cost path from the client 110 to the server 120, a minimum cost path from the node 133 to the server 120 is the routing path $RP-A_1$, which passes the link 143.

As another example, when the node 131 obtains the information regarding the congestion condition that has occurred on the link 143, the node 131 may select, based on the obtained congestion condition information, an additional routing path from among at least one candidate routing path. Each candidate routing path may extend from the node 131 to the destination node (for example, the server 120) and bypass the link 143. However, unlike the above-described example, since the node 131 is not on the link 143 in which the congestion condition occurs, each candidate routing path does not necessarily diverge from the routing path RP-B$_1$ at the node 131, and may diverge at another node on the routing path RP-B$_1$. For example, the candidate routing paths may include a path (hereinafter also referred to as the "routing path RP-B$_2$") extending from the node 131 to the server 120 along the links 141, 142, 150, 147, and 148, a path (hereinafter also referred to as the "routing path RP-B$_3$") extending from the node 131 to the server 120 along the links 141, 142, 149, 146, 147, and 148, and a path (hereinafter also referred to as the "routing path RP-B$_4$") extending from the node 131 to the server 120 along the links 145, 146, 147, and 148. Then, the node 131 may calculate a minimum cost path among the candidate routing paths and select the calculated path as the additional routing path.

In operation S350, some of the data traffic is transmitted along the established routing path, and some other of the data traffic is transmitted along the additional routing path.

As an example, when the node 133 selects the routing path RP-A$_2$ as the additional routing path based on the information on the congestion condition that has occurred on the link 143, the node 133 may transmit a first portion and a second portion of the data traffic along the established routing path RP-A$_1$ and the additional routing path RP-A$_2$, respectively. Further, the node 133 may determine, based on the congestion condition information, the transmission rate of each of the first portion and the second portion of the data traffic.

As another example, when the node 131 selects the additional routing path based on information on the congestion condition that has occurred on the link 143, the node 131 may identify, from among the nodes 131, 132, 133, 134, and 120 along the established routing path RP-B$_1$, a node at which the additional routing path diverges from the routing path RP-B$_1$. For example, when the routing path RP-B$_4$ is selected as the additional routing path, the node 131 may identify that the node 131 itself is the node at which the routing path RP-B$_4$ diverges from the routing path RP-B$_1$. Therefore, the node 131 may transmit the first portion and the second portion of the data traffic along the established routing path RP-B$_1$ and the additional routing path RP-B$_4$, respectively, and determine the transmission rate of each of the first portion and the second portion of the data traffic based on the congestion condition information. Alternatively, when the routing path RP-B$_2$ is selected as the additional routing path, the node 131 may identify that the node 133 is the node at which the routing path RP-B$_2$ diverges from the routing path RP-B$_1$. Therefore, the data traffic may be transmitted through the same links 141 and 142 from the node 131 to the node 133. When the node 133 selects the additional routing path based on the same congestion condition information, the selected routing path may be the routing path RP-A$_2$. Therefore, the node 133 may distribute the data traffic through the established routing path RP-A$_1$ and the routing path RP-A$_2$. On the other hand, when the node 133 does not or cannot select an additional routing path according to the congestion condition information, the node 131 may transmit a notification of the routing path RP-B$_2$ or that of the routing path RP-A$_2$ that is included in the routing path RP-B$_2$ and extends from the node 133 to the server 120, to the node 133. This notification enables the node 133 to transmit the first portion and the second portion of the data traffic along the established routing path RP-A$_1$ and the additional routing path RP-A$_2$, respectively.

Figure 4:
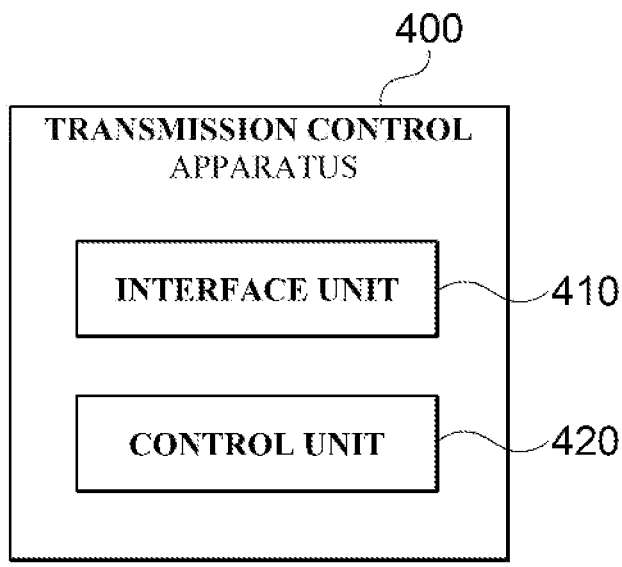
FIG. 4 is a diagram illustrating an apparatus for controlling transmission of data traffic to a destination node according to an exemplary embodiment.

FIG. 4 illustrates an apparatus for controlling transmission of data traffic to a destination node according to an exemplary embodiment. An exemplary transmission control apparatus 400 may be implemented or included in a node in the network environment 100.

As illustrated in FIG. 4, the transmission control apparatus 400 includes an interface unit 410 and a control unit 420.

The interface unit 410 is configured to obtain information regarding a congestion condition that has occurred on a first routing path during transmission of data traffic to the destination node. The congestion condition information may indicate a congestion condition that has occurred at a link on the first routing path. Further, the congestion condition information may further indicate a packet loss rate of the link and/or a packet delay of the link. The congestion condition information may be generated by a node that is located on the first routing path and has detected the congestion condition, and may be transmitted to other nodes.

The control unit 420 is configured to select a second routing path based on the obtained congestion condition information and route the first portion and the second portion of the data traffic to the destination node along the first routing path and the second routing path, respectively. For example, the control unit 420 may be configured to select the second routing path from among at least one candidate routing path based on the congestion condition information. Each candidate routing path may be a path that extends from a predetermined node to the destination node and bypasses the link at which the congestion condition occurs. When the transmission control apparatus 400 is implemented in a specific node, it may be predetermined that the second routing path is selected from among paths extending from the specific node to the destination node.

In some embodiments, the control unit 420 may be configured to allow the predetermined node to transmit the first portion and the second portion of the data traffic along the first routing path and the second routing path, respectively. In particular, when each candidate routing path diverges from the first routing path at the predetermined node (for example, the node in which the transmission control apparatus 400 is implemented), the first and the second routing paths may extend from the predetermined node to different subsequent nodes, respectively. Therefore, the control unit 420 may allow the data traffic to be distributed to the first routing path and the second routing path from the predetermined node. In addition, the control unit 420 may determine a transmission rate of the first portion of the data traffic and a transmission rate of the second portion of the data traffic based on the congestion condition information. Accordingly, a transmission rate of the data traffic passing out of the source node (for example, the client 110) should not necessarily be reduced after the congestion condition occurs. This is because, when the second routing path has a sufficient bandwidth, the control unit 420 can ensure a transmission rate of the second routing path by a degree by which the transmission rate of the established first routing path is decreased. Therefore, it is possible to maximize transmission efficiency while maintaining network fairness.

In some embodiments, the control unit 420 may be further configured to identify, from among a plurality of nodes on the first routing path, a node at which the second routing path diverges from the first routing path. When a path that diverges from the first routing path at a node other than the predetermined node (for example, the node in which the transmission control apparatus 400 is implemented) is selected, as the second routing path, from among the candidate routing paths, there would be no need that the data traffic be distributed at the predetermined node. Rather, the transmission control apparatus 400 may be implemented in the node identified as described above, and the data traffic may be distributed at the identified node. When the transmission control apparatus 400 is not implemented in the identified node, the control unit 420 may transmit, to the identified node, a notification of the second routing path or a notification of a routing path that is included in the second routing path and extends from the identified node to the destination node, and may thereby allow the identified node to distribute the data traffic. Meanwhile, when the identified node is the predetermined node, the control unit 420 may allow the node to transmit the first portion and the second portion of the data traffic along the first routing path and the second routing path, respectively. In any case, a transmission rate of the data traffic passing out of the source node (for example, the client 110) may not be decreased even after the congestion condition occurs.

According to exemplary embodiments, when a congestion condition occurs during transmission of data traffic, the data traffic may be distributed through different routing paths.

According to exemplary embodiments, it is possible to increase transmission efficiency while guaranteeing network fairness.

Exemplary embodiments may be applied to high-speed data transmission without requiring excessive traffic cost.

According to exemplary embodiments, it is possible to effectively transmit data (for example, pre-stored mass file data or real-time multimedia data generated in real time) that cannot be deployed in a distributed manner in advance.

Meanwhile, an exemplary embodiment of the present disclosure can include a computer-readable storage medium including a program for performing the methods described herein on a computer. The computer-readable storage medium may separately include program commands, local data files, local data structures, etc. or include a combination of them. The computer-readable storage medium may be specially designed and configured for the present disclosure, or known and available to those of ordinary skill in the field of computer software. Examples of the computer-readable storage medium include magnetic media, such as a hard disk, a floppy disk, and a magnetic tape, optical recording media, such as a CD-ROM and a DVD, magneto-optical media, such as a floptical disk, and hardware devices, such as a ROM, a RAM, and a flash memory, specially configured to store and execute program commands. Examples of the program commands may include high-level language codes executable by a computer using an interpreter, etc., as well as machine language codes made by compilers. According to another embodiment, a computer program for executing operations described in this specification. The program may be combined with hardware and stored, in a medium such as the computer readable storage medium, for execution of the operations.

It will be apparent to those familiar with this field that various modifications can be made to the above-described exemplary embodiments of the present disclosure without departing from the spirit or scope of the present disclosure. Thus, it is intended that the present disclosure covers all such modifications provided they come within the scope of the appended claims and their equivalents.

What is claimed is:

1. An apparatus for controlling transmission of data traffic to a destination node in a network environment, the apparatus comprising:
an interface unit configured to obtain information regarding a congestion condition that has occurred on a first routing path during transmission of the data traffic, the first routing path connecting a source node in the network environment to the destination node; and
a control unit configured to determine, based on the information, a second routing path to route, to the destination node, a first portion and a second portion of the data traffic along the first routing path and the second routing path, respectively,
wherein the control unit is further configured to determine the second routing path to bypass an immediate neighboring node in the first routing path and connect the apparatus to the destination node through another immediate neighboring node, identify, from among a plurality of nodes on the first routing path, a node at which the second routing path diverges from the first routing path, allow the identified node to transmit the first and the second portions along the first and the second routing paths, respectively, when the identified node is the predetermined node, and transmit to the identified node, a notification of the second routing path or a notification of a routing path that is included in the second routing path and extends from the identified node to the destination node, when the identified node is not the predetermined node.

2. The device according to claim 1, wherein the information indicates the congestion condition that has occurred on a link in the first routing path.

3. The device according to claim 2, wherein the control unit is configured to select, based on the information, the second routing path from among at least one candidate routing path, and wherein each of the at least one candidate routing path extends from the predetermined node to the destination node while bypassing the link.

4. The device according to claim 3, wherein the at least one candidate routing path diverges from the first routing path at the predetermined node, and wherein the control unit is further configured to allow the predetermined node to transmit the first and the second portions along the first and the second routing paths, respectively.

5. The device according to claim 4, wherein the control unit is further configured to determine, based on the information, a transmission rate of the first portion and a transmission rate of the second portion.

6. The device according to claim 3, wherein the second routing path is a minimum cost path among the at least one candidate routing path.

7. The device according to claim 2, wherein the information further indicates at least one of a packet loss rate on the link and a packet delay on the link.

8. The device according to claim 1, wherein the congestion condition is detected at an intermediate node on the first routing path, and wherein the information originates from the intermediate node.

9. A method for controlling transmission of data traffic to a destination node in a network environment, the method comprising:
obtaining information regarding a congestion condition that has occurred on a first routing path during the transmission of the data traffic, the first routing path connecting a source node in the network environment to the destination node; and determining, based on the information, a second routing path to route, to the destination node, a first portion and a second portion of the data traffic along the first routing path and the second routing path, respectively, wherein the determining comprises determining the second routing path to bypass an immediate neighboring node in the first routing path and connect to the destination node through another immediate neighboring node, identifying, from among a plurality of nodes on the first routing path, a node at which the second routing path diverges from the first routing path, allowing the identified node to transmit the first and the second portions along the first and the second routing paths, respectively, when the identified node is a predetermined node, and transmitting to the identified node, a notification of the second routing path or a notification of a routing path that is included in the second routing path and extends from the identified node to the destination node, when the identified node is not the predetermined node.

10. The method according to claim 9, wherein the information indicates the congestion condition that has occurred on a link in the first routing path.

11. The method according to claim 10, wherein the selecting of the second routing path comprises selecting, based on the information, the second routing path from among at least one candidate routing path, and wherein each of the at least one candidate routing path extends from the predetermined node to the destination node while bypassing the link.

12. The method according to claim 11, wherein the at least one candidate routing path diverges from the first routing path at the predetermined node, and wherein the method further comprises allowing the predetermined node to transmit the first and the second portions along the first and the second routing paths, respectively.

13. The method according to claim 12, further comprising: determining, based on the information, a transmission rate of the first portion and a transmission rate of the second portion.

14. The method according to claim 11, wherein the second routing path is a minimum cost path among the at least one candidate routing path.

15. The method according to claim 10, wherein the information further indicates at least one of a packet loss rate on the link and a packet delay on the link.

16. The method according to claim 9, wherein the congestion condition is detected at an intermediate node on the first routing path, and wherein the information originates from the intermediate node.

17. A non-transitory computer-readable storage medium having stored thereon computer executable instructions which, when executed, perform a method for controlling transmission of data traffic to a destination node, the method comprising:

obtaining information regarding a congestion condition that has occurred on a first routing path during the transmission of the data traffic, the first routing path connecting a source node in the network environment to the destination node; and determining, based on the information, a second routing path to route, to the destination node, a first portion and a second portion of the data traffic along the first routing path and the second routing path, respectively, wherein the determining comprises determining the second routing path to bypass an immediate neighboring node in the first routing path and connect to the destination node through another immediate neighboring node, identifying, from among a plurality of nodes on the first routing path, a node at which the second routing path diverges from the first routing path, allowing the identified node to transmit the first and the second portions along the first and the second routing paths, respectively, when the identified node is a predetermined node, and transmitting to the identified node, a notification of the second routing path or a notification of a routing path that is included in the second routing path and extends from the identified node to the destination node, when the identified node is not the predetermined node.

* * * * *